United States Patent
Haje et al.

(10) Patent No.: US 6,382,684 B2
(45) Date of Patent: May 7, 2002

(54) DEVICE FOR CONNECTING PIPING SECTIONS

(75) Inventors: Detlef Haje, Bottrop; Lothar Scholl, Mülheim, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/878,663

(22) Filed: Jun. 11, 2001

Related U.S. Application Data (63) Continuation of application No. PCT/EP99/09087, filed on Nov. 24, 1999.

(30) Foreign Application Priority Data

Dec. 9, 1998 (EP) .............................. 98123061

(51) Int. Cl.$^7$ .............................................. F16L 25/00
(52) U.S. Cl. ..................................................... 285/330
(58) Field of Search ................................. 285/330, 364, 285/381.1, 187, 363

(56) References Cited

U.S. PATENT DOCUMENTS

| | | | |
|---|---|---|---|
| 2,890,900 A | * | 6/1959 | Williamson, Jr. et al. ... 285/330 |
| 3,443,827 A | * | 5/1969 | Acker et al. ................. 285/330 |
| 3,469,865 A | * | 9/1969 | Ellenburg .................... 285/330 |
| 5,188,399 A | * | 2/1993 | Durina .................... 285/330 X |
| 6,267,417 B1 | * | 7/2001 | Fan ............................. 285/330 |

FOREIGN PATENT DOCUMENTS

| | | |
|---|---|---|
| DE | 1286356 | 1/1969 |
| DE | 2452770 | 5/1976 |
| DE | 19711580 A1 | 9/1998 |

\* cited by examiner

Primary Examiner—Lynne H. Browne
Assistant Examiner—David E. Bochna
(74) Attorney, Agent, or Firm—Laurence A. Greenberg; Werner H. Stemer; Gregory L. Mayback (57) ABSTRACT

To connect piping sections of a pipeline through which a hot and highly compressed medium flows, a number of tension elements are provided. The tension elements extending with their tension shanks in a longitudinal direction of the pipe between shaped elements which are provided at the pipe ends and are adjacent in the circumferential direction of the pipe. Shaped parts are provided at the ends of the tension shank and extend on both sides of the tension element in its transverse direction engaging behind the shaped elements in the circumferential direction of the pipe.

14 Claims, 5 Drawing Sheets

DEVICE FOR CONNECTING PIPING SECTIONS

CROSS-REFERENCE TO RELATED APPLICATION

This application is a continuation of copending International Application No. PCT/EP99/09087, filed Nov. 24, 1999, which designated the United States.

BACKGROUND OF THE INVENTION

Field of the Invention

The invention relates to a device for connecting piping sections of a pipeline through which a medium flows. The invention contains a number of tension elements disposed so as to be distributed over the circumference of pipe ends of the pipeline. In this case, the expression pipeline refers in particular to a pipeline through which a hot medium, for example steam, under high pressure flows.

On account of the steam parameters to be expected in future power plants, having a steam or live-steam temperature of more than 600° C. and a steam pressure of more than 250 bar, correspondingly high demands will be imposed on the pipelines and piping connections. In such a steam feed line, the connecting point between pipe sections of the pipeline carrying steam may be configured to be welded and thus undetachable or may be configured to be detachable like a flange connection. Such connections are also provided between the pipeline and a steam inlet valve of a steam turbine and between the steam inlet valve and the turbine casing. Whereas known detachable connections, on account of the low residual material characteristics of conventional materials related to the temperature, can only be used to a limited extent, welded connections, in particular in the event of an inspection, have disadvantages with regard to ease of assembly and dismantling.

The use of conventional pipe connections like a flanged and screwed pipe joint, a screwed pipe joint by a cap nut or a clamped connection, is problematic at high and maximum steam states for different reasons. The flanged and screwed pipe connection requires the availability of a screw material of sufficient strength. In addition, on account of the round screw cross section, only a limited proportion of the flange surface, i.e. of the space available radially around the pipeline, can be utilized for applying tensile forces. Furthermore, the round supporting surface of the nut requires a minimum distance from adjacent constructional elements, so that a minimum flange outside diameter results from the outside diameter of the pipeline and the minimum distance between adjacent nuts on the pitch circle and also from the outside diameter of the supporting surface. The resulting distance between the pipe outer wall and the center of the screw bolt produces a relatively high flange moment, a factor that constitutes a considerable disadvantage in particular with low available material characteristics.

In a pipe connection using a cap nut, a stress concentration occurs in particular at the transition from the cylindrical region to the axial bearing region. With low material characteristics related to the temperature, a limit in the creep deformations in this region has to be taken into account in the configuration of the cap nut, a factor which leads at high steam states to relatively large components, which can therefore only be handled with difficulty. Since a flange, after the cap nut has been inserted, has to be welded to, for example, the valve to be connected, this has an adverse effect on both the production, when welding correspondingly large wall thicknesses, and on the overall length of the connection. In addition, a relatively large, radial and axial space is required at high temperatures.

The relatively large radial expansions also result in a clamped connection disclosed, for example, by Published, Non-Prosecuted German Patent Applications DE 197 11 580 A1 or by DE 24 52 770 A1, in which a clamped connection of a number of connecting elements in the form of claw-like or clamp-like ring segments are disposed on the circumference of the flange-like connection. In addition, in a flange connection with such connecting elements, there is the disadvantage that the latter do not have sufficient strength to absorb the tensile forces, especially as the connecting elements, as a result of radially surrounding the outsides of the flange, are also subjected to a bending load in addition to a tensile stress.

Specific cooling in the region of such pipe connections between the medium carried by the pipeline and the flange connection is also problematic, since flange cooling requires an additional radial distance between the flange and the pipeline for the cooling medium. In addition, heat losses may occur due to such cooling, and these heat losses, in a steam line, may lead to a loss of working capacity, that is to an energy loss of the medium carried in the pipeline.

SUMMARY OF THE INVENTION

It is accordingly an object of the invention to provide a device for connecting piping sections which overcomes the above-mentioned disadvantages of the prior art devices of this general type.

With the foregoing and other objects in view there is provided, in accordance with the invention, a combination of a pipeline having connecting pipes with pipe ends and contact surfaces, with a device for connecting the pipes through which a medium flows. The device contains shaped elements disposed at the pipe ends of the pipes and a number of tension elements disposed distributed over a circumference of the pipe ends of the pipes. Each of the tension elements have a tension shank with ends and extend in a longitudinal direction of the pipes between the shaped elements and the tension elements are disposed adjacent to each other in a circumferential direction of the pipes. Each of the tension elements have shaped parts with one of the shaped parts disposed at each of the ends of the tension shank and the shaped parts extend in a transverse direction of the tension elements. The shaped parts engage in the circumferential direction of the pipes behind the shaped elements at an end remote from the contact surfaces of the pipe ends.

The object is achieved by a number of tension elements. The tension elements extend with their tension shanks in the longitudinal direction of the pipe between shaped elements which are disposed at the pipe ends and are disposed adjacent to each other in the circumferential direction of the pipe. Shaped parts provided at the ends of the tension shank of the respective tension element and extending on both sides of the tension element in its transverse direction engage behind or overlap the shaped elements provided at the pipe ends in the circumferential direction of the pipe preferably in a positive-locking manner.

The connecting device has a plurality of the tension elements preferably disposed so as to be uniformly distributed over the circumference of the piping sections to be connected. The connecting device has at the same time a high strength and also at a high temperature and a high pressure of the medium carried in the pipeline, ensures an especially compact configuration of the connecting elements with especially low radial expansion compared with the known flange connections, in particular compared with the known clamped connections. In addition, stress concentrations as a result of force deflections are reduced. Furthermore, an especially advantageous equilibrium of forces, while avoiding a bending load on the tension elements, is achieved on account of the symmetrical configuration and in particular on account of the symmetrical configuration of the tension and shaped elements.

By the suitable forming of the shaped parts of the tension element or of each tension element and of the shaped elements on the respective pipe end, an especially favorable ratio between tensile cross section of the tension element and the effective areas can be set inside the positive-locking connection.

With regard to the tension elements and their shaped parts and with regard to the shaped elements of the pipe sections, a variant in which the shaped elements are formed by radial projections which are attached to or integrally formed on the respective pipe end and are therefore discrete is especially advantageous. The radial projections may also be produced by incorporating grooves in an annular bead integrally formed on the pipe end. In this variant, the shaped parts preferably integrally formed on the ends of the tensile shank, extending between adjacent projections in the longitudinal direction of the pipe, of the respective tension element are expediently configured like a hammer head. The shaped parts, that are configured in mirror symmetry like an I-girder with regard to the longitudinal axis of the tension element and which therefore project on both sides of the tension element beyond its shank in the transverse direction, engage behind the shaped elements of the respective pipe section in the circumferential direction of the pipe at the end remote from the corresponding pipe orifice.

In an expedient configuration, each pipe end has a pipe wall thickness increasing toward its contact surface, whereas the tension shank of the tension element is channeled on the side facing the pipe ends and is therefore of necked-down or concave configuration. In both embodiments, the tension element has a tension shank extending between the shaped parts and having a ring-segment-like cross-sectional area. However, the cross-sectional area may also be trapezoidal, rectangular, kidney-shaped or hexagonal.

Alternatively, the shaped elements are formed as radial recesses in the pipe wall of the pipe end, the respective pipe end being of correspondingly thick-walled configuration. In this variant the tension elements, the shaped parts of which are inserted into the recesses in a positive-locking manner, are expediently configured at the end like a double hammer root or a fir-tree root, as is conventional practice in the case of turbine blades. Further types of joining are also conceivable, for example a saw-tooth, a hooked or a dove-tailed connection. The respective shaped part of the tension element then has a corresponding number of partial branches lying one behind the other in the longitudinal direction of the pipe and being in engagement in the recess in a parallel configuration and having an outer contour adapted to the contour of the recess, the partial branches in turn projecting in the circumferential direction of the pipe, i.e. extending in the circumferential direction of the pipe. An especially preferred embodiment of this variant is a fir-tree head on the respective end of the tension element.

The tension element itself is advantageously prestressed like a tie rod. This reliably prevents the pipe ends from lifting from one another during pressurizing. To compensate for tolerances and to compensate for operationally induced elongations of the tension elements, shims are expediently provided between the opposite effective areas of the shaped parts, on the one hand, and the shaped elements, on the other hand, at least at one end of the tension element. In this case, the shim or each shim may be produced to oversize. Alternatively or additionally, a spring-back sealing element may also be provided between the pipe ends. The effective areas opposite one another may also be configured to be inclined relative to one another in such a way that the shim is virtually drawn into the groove formed between the effective areas at a distance from one another. In addition, the configuration of an inclined or rising effective area on the shaped element and/or on the shaped part has the advantage that the shaped part of the tension element is held in position during assembly. The tie rods are preferably tightened by a hydraulic device or by thermal elongation.

To avoid stress concentrations as a result of notch effects on the tension shank, extending between the shaped parts, of the tension element, the latter, on its bearing surface facing the pipe ends, has rounded-off-surface edges preferably both in the region of the shaped parts and along the tension shank. Accordingly, the shaped element or each shaped element has surface corners rounded off at the transition to the pipe end and having a rounded portion corresponding to the rounded edge portions of the tension element and having a certain radius of curvature or a combination of radii. On the one hand, this avoids sharp surface edges, which promote notch effects, inside the connection. On the other hand, especially tight bearing of the respective tension element against the outer surface of the pipe ends is possible by a rounded portion of the surface edges and corners having radii adapted to one another.

The tension elements or each tension element may also be disposed at a distance from the pipeline with a defined radial gap. The introduction of heat from the medium carried in the pipeline via the pipe outer surface into the tension element is thus reduced. On account of the heat-transmission resistance between the medium and the tension element, only a comparatively small quantity of heat is to be dissipated here if the tension elements are cooled. This advantageously leads to only a slight reduction in the temperature of the medium in the pipeline. Therefore, each of the tension elements has a heating bore for transmitting heat.

The advantages achieved with the invention consist in particular in the fact that, by the pipe connection formed by the tension elements which are connected in a positive-locking manner to corresponding shaped elements on the pipe ends of piping sections to be connected, especially favorable division of the available circumferential area of the pipeline with at the same time especially high surface utilization is achieved.

Furthermore, due to specific adaptation of the radial extent of the connection and the advantageous division of the available area, especially small deformations of the tension elements and of the pipe ends and thus only slight mechanical stresses inside the connection occur owing to the fact that the tension elements lie in the radial flange grooves or radial grooves formed by the projections or by the recesses, the tension elements bear virtually directly against the pipe outer wall beyond which the shaped elements project on the pipe end side, with the result that the smallest possible radial expansion of the connection is achieved.

Advantageously used as an assembly aid and for fixing are clamping rings which enclose the tension elements and, as a result of the radial force thus produced, hold them in their position.

In accordance with an added feature of the invention, the tension shank has a cross-sectional area shaped like a segment of a circle.

In accordance with another feature of the invention, each of the pipe ends has a contact surface and a pipe wall thickness increases toward the contact surface, and the tension shank is channeled on a side facing the pipe ends.

In accordance with a concomitant feature of the invention, the tension elements have a symmetrical configuration in both a longitudinal direction and a transverse direction.

Other features which are considered as characteristic for the invention are set forth in the appended claims.

Although the invention is illustrated and described herein as embodied in a device for connecting piping sections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a pipe connection 1 in a region of pipe ends 2, 3 of two piping sections or pipe lengths 4 and 5, respectively, only a segment of which is shown and which, in operation, carry, for example, hot live steam D under high pressure, and are referred to below as a pipeline. The steam D has, for example, a temperature of more than 600° C. and a pressure of more than 250 bar and thus a high steam state, as is to be expected in future power plants for the generation of electrical energy.

Figure 5:
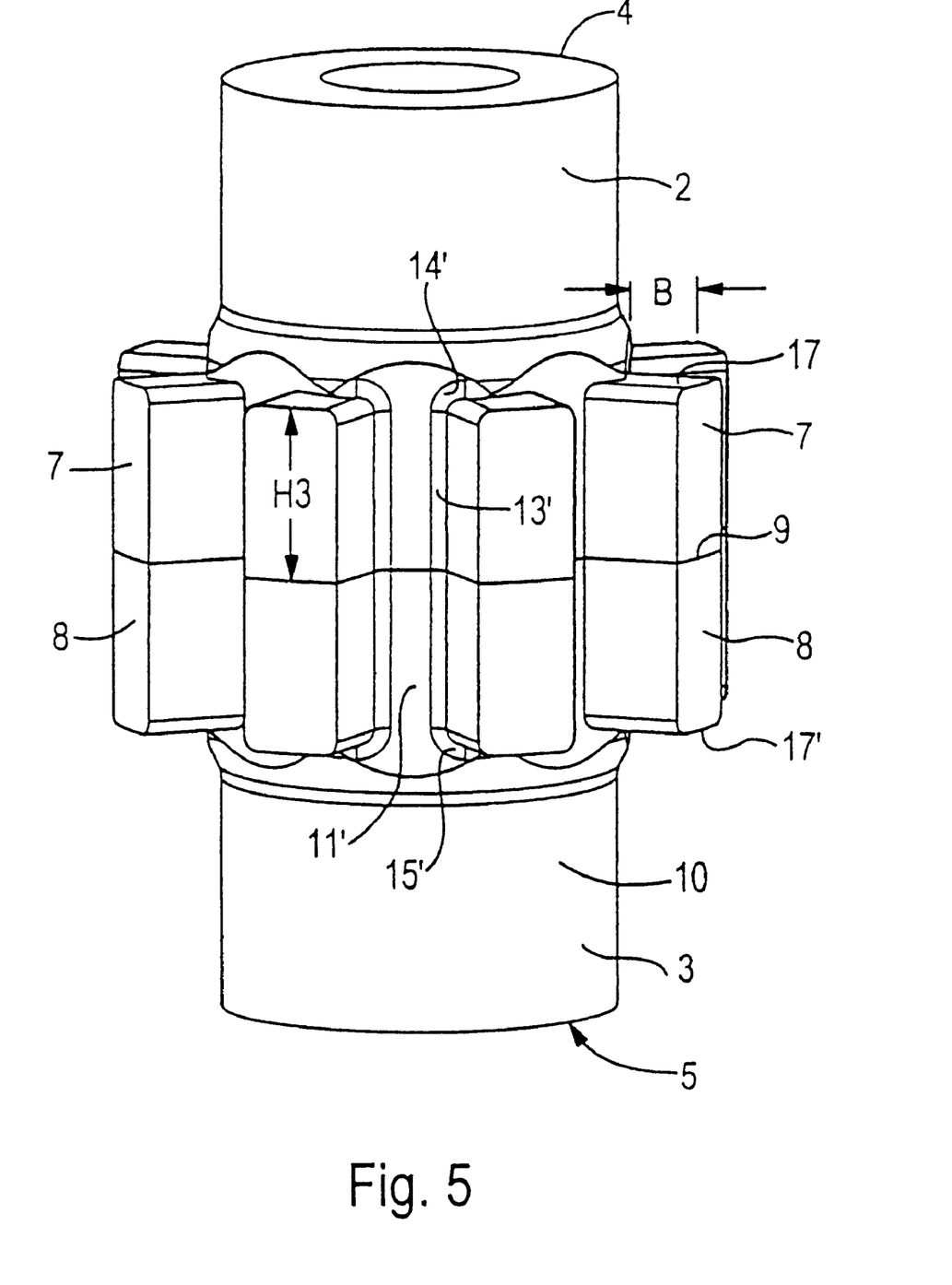
FIG. 5 is a perspective view of pipe ends of piping sections having shaped elements configured as projections.

The pipe connection 1 has a number of tension elements 6 which are disposed so as to be distributed over a circumference of the pipe ends 2, 3 and are connected in a positive-locking manner to shaped elements 7 and 8, respectively, integrally formed on the pipe ends 2, 3. The tension elements 6, which are preferably of symmetrical configuration in both a longitudinal direction L and a transverse direction Q, lie in the longitudinal direction L of the pipe in the final assembled state and in the process cover a parting seam 9 between the pipe ends 2, 3, i.e. between their contact surfaces, at least approximately equally. For this purpose, each tension element 6 has a shaped part 6a, 6b at each end, the shaped parts 6a, 6b being hammerhead-shaped in the exemplary embodiment, and a tension shank 6c extends between and in one piece with them. The tension shank 6c of the tension element 6 extends in the longitudinal direction L of the pipe between the shaped-element pairs 7, 8 of the pipe ends 2, 3, the pairs being adjacent in the circumferential direction of the pipe. With its bearing surface 11, preferably in an accurately fitting manner in a groove formed by the shaped elements 7, 8, the tension element 6 bears directly against the outside of a pipe wall 10, i.e. against its corresponding bearing surface 11' (FIG. 5). This is illustrated in FIG. 3 in a sectional representation taken along line III—III shown in FIG. 1.

Figure 3:
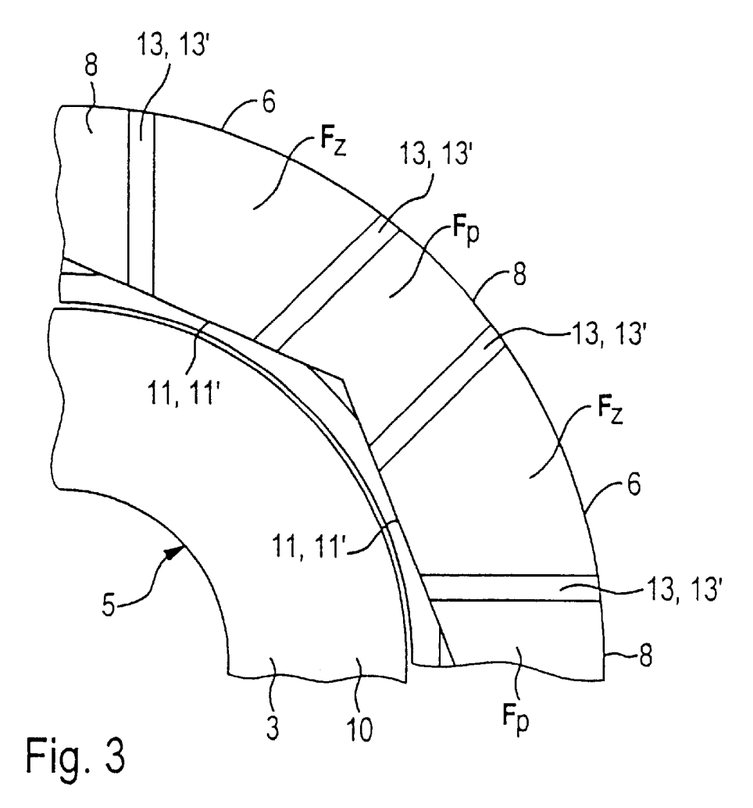
FIG. 3 is a partial, cross-sectional view of a circle segment of the pipe connection taken along the line III—III shown in FIG. 1.

As illustrated in FIG. 3 with reference to the shaped elements 8 of the pipe end 3 and as can clearly be seen from FIG. 5, the shaped elements 7, 8 are integrally formed on the pipe outer wall 10 of the respective pipe end 2 or 3 in the form of projections. Alternatively, an annular bead may also be integrally formed on the pipe ends 2, 3, grooves accommodating the tension elements 6 being made in the annular bead. Especially favorable utilization of space at the pipe circumference with little radial expansion of the pipe connection 1, resulting in especially small lever arms, is achieved by the direct bearing of the tension elements 6 against the pipe outer wall 10. It can also be seen that the ratio between tension cross sections $F_z$ of the tension elements 6 and pressure areas $F_p$ of the shaped elements 7, 8 and the effective pressure areas $F_p'$ (see FIG. 4), corresponding with the latter, of the tension elements 6 can be optimized in a simple manner with regard to the material geometry.

Figure 4:
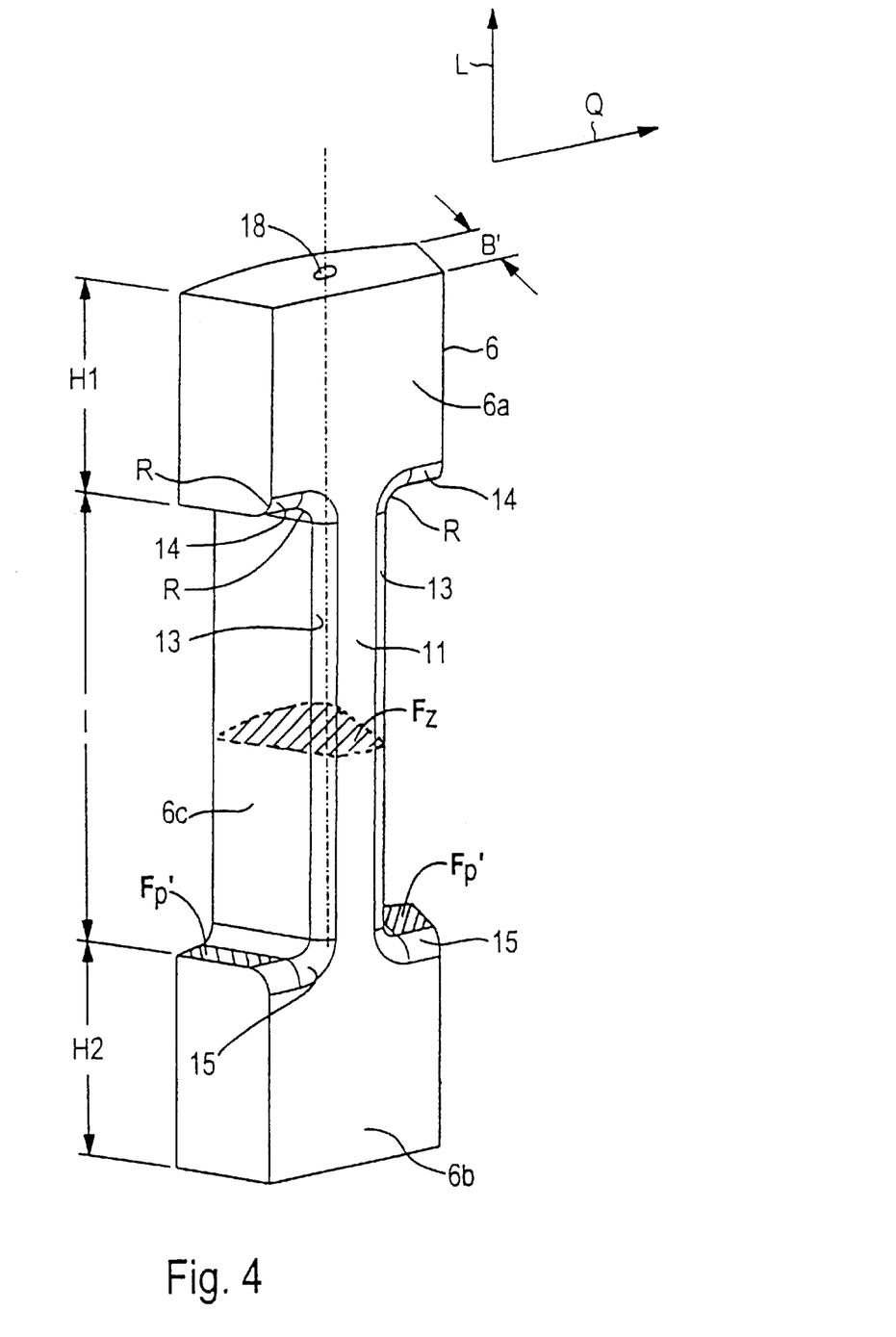
FIG. 4 is a perspective view of a preferred embodiment of the tension element shown in FIG. 1.

FIG. 4 shows a preferred embodiment of the tension element 6. The tension cross-sectional area $F_z$ and the pressure areas $F_p'$ are shown hatched here for the purposes of illustration. The tension element 6 corresponds in cross section to a segment of a circular ring. Surface edges 13 in a region of the bearing surface 11 of the tension shank 6c of the tension element 6 are provided with a rounded portion R. Accordingly, surface edges 14, 15, adjoining the surface edges 13, of the shaped parts 6a and 6b, respectively, are rounded off in the region of the bearing surface 11, so that an especially favorable configuration from the notching point of view is provided for overall by the rounded portions 13 to 15. A height H1 and H2 of the shaped parts 6a and 6b, respectively, is selected with regard to sufficiently low mechanical stresses, i.e. bending or shearing stresses resulting from a force at right angles to the shaped part 6a, 6b.

The advantage of this configuration of the tension elements 6 and of the shaped elements 7, 8 of the pipe ends 2 and 3, respectively, the shaped elements 7, 8 corresponding with the tension elements 6 within the positive-locking connection, consists in particular in the fact that the force is transmitted very close to the pipe outside diameter and thus very close to the pipe outer wall 10. As a result, the space available radially is utilized in an especially favorable manner. Such a compact type of construction of the pipe connection 1 has an advantageous effect in particular with the low material characteristics that exist at high temperatures. A considerably larger tension cross section $F_z$ can therefore be achieved overall compared with a flange connection. In addition, the connection has a favorable cross section $F_z+F_p$ which can be utilized as a whole for the transmission of force. In this case, the ratio of the pressure areas $F_p$, $F_p{'}$—and thus of the positive-locking areas—to the tension cross sections $F_z$—and thus to the tension region—of the tension elements 6 may be selected in such a way that the respective stress limit values of the materials used for the tension element 6 and the pipe ends 2, 3 can be utilized to an especially high degree.

The configuration of the shaped elements 7, 8 on the pipe ends 2, 3 of the pipeline 4, 5 are shown in FIG. 5, which shows the pipe ends 2, 3 with the projections or the shaped elements 7 and 8, respectively, integrally formed thereon, without the tension elements 6. Surface corners 13' and 15' are provided with a corresponding rounded portion R in the transition region between the shaped elements 7, 8 and the outer circumference 11' of the respective pipe end 2 and 3, respectively. A height H3 of the shaped elements 7, 8 is established with regard to a sufficiently low stress level.

The radial extent and thus a width B, B' (FIG. 4) of the shaped elements 7, 8 and of the tension elements 6, respectively, are determined from the active axial connecting force, which depends essentially on the internal pressure prevailing in the pipeline 4, 5, and from the admissible pressures and tensile stresses. By selecting the respective height H3 and H1, H2, the projections or shaped elements 7, 8, which are subjected to bending stress, and the shaped parts 6a, 6b of the tension elements 6 can be configured in such a way that bending and shearing stresses and also corresponding deformations are sufficiently low. The configuration of the shaped parts 6a, 6b on both sides, preferably a symmetrical configuration of the same, on the tension element 6 avoids undesirable bending in the tension region, i.e. in the region of the tension shank 6c. This corresponds to the design principle of the equilibrium of forces. The connecting device or pipe connection 1 with a symmetrical configuration of the shaped elements 7, 8 and shaped parts 6a, 6b ensures that stress concentrations due to a force deflection are substantially reduced, and a region having only a tensile stress without bending is created. A mass of the tension element 6 is markedly smaller than the mass of a corresponding cap nut.

Figure 1:
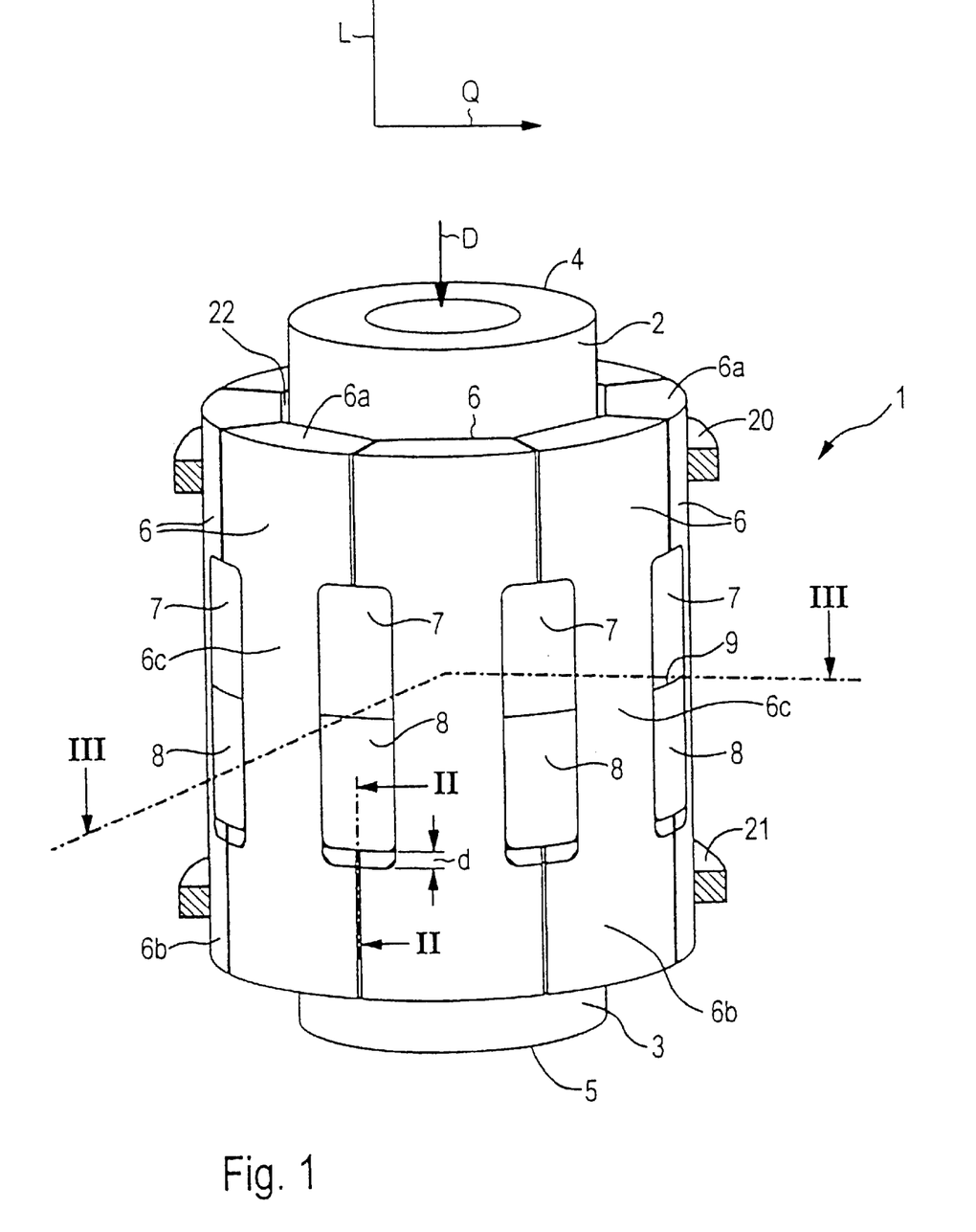
FIG. 1 is a perspective view of a pipe connection having a number of tension elements disposed so as to distributed over a pipe circumference according to the invention.
Figure 2:
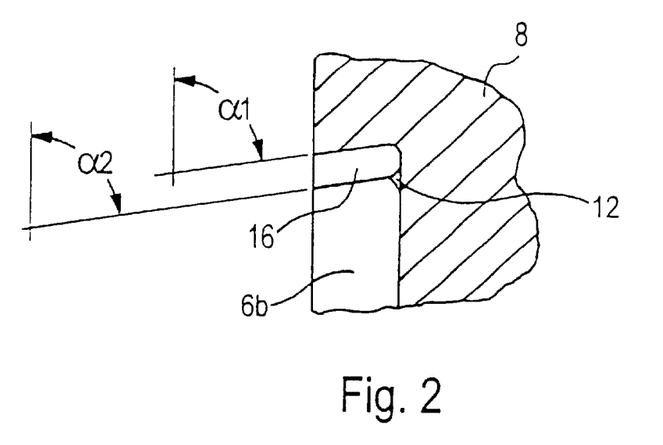
FIG. 2 is a sectional view taken along the line II—II shown in FIG. 1 with a shim between a tension element and a shaped element of the pipe connection.

The tension elements 6 are preferably prestressed, so that the lifting of the pipe ends 2, 3 from one another as a result of pressurizing is prevented. Tolerances of the components and unavoidable elongations of the tension elements 6 upon reuse after a long operating period under high temperatures are expediently compensated for by shims 16 (FIG. 1, FIG. 2). The shims 16 are preferably produced with due regard to the actual dimensions of the components, i.e. in particular with due regard to a distance between bearing surfaces 17, 17' of the shaped elements 7 and 8 (FIG. 5), respectively, of the pipe ends 2, 3, and the distance between the shaped parts 6a, 6b of the tension elements 6. With reference to these dimensions, i.e. twice the height H3 and a length l of the tension shank 6c (FIG. 4), a requisite shim thickness d is determined and a corresponding shim 16 produced. This compensates for tolerances, and for creep deformations that occur during previous operation as a result of high temperatures, and additionally prestresses the tension elements 6, which act as tie rods. This is expediently effected by the shims 16 being produced with oversize.

The effective or pressure areas $F_p$, $F_p{'}$ opposite one another may also be configured to be inclined relative to one another in such a way that the shim 16 is virtually drawn into a chamber 12 formed between the effective areas $F_p$, $F_p{'}$ at a distance from one another. This is illustrated in FIG. 2, which shows a section taken along line II—II shown in FIG. 1. Here, the angles $\alpha_1$ and $\alpha_2$ of inclination of the pressure or effective areas $F_p$ and $F_p{'}$, respectively, are shown exaggerated. In addition, the configuration of an inclined or rising effective area $F_p$, $F_p{'}$ on the shaped element 8 and/or on the shaped part 6b has the advantage that the shaped part 6b of the tension element 6 is held in position during assembly.

The angles $\alpha_1$ and $\alpha_2$ should be selected in accordance with the relationship $\alpha_1 \leq \alpha_2 < 90°$.

Once the tension elements 6 have been inserted between the shaped elements 7, 8 and the corresponding shaped parts 6a have been brought into contact with the shaped elements 7 at one end, expediently the top end, and have been fixed there if need be, the tension elements 6 are expediently elongated thermally or hydraulically. The elongation is effected until the oversize of the shims 16 has been overcome and the shims 16 can be inserted. A heating bore 18 which passes through the respective tension element 6 in the longitudinal direction L is expediently provided for the thermal elongation (FIG. 4). The tension elements 6 are clamped after the elongation is neutralized. The connection 1 is released in the opposite sequence.

Figure 6:
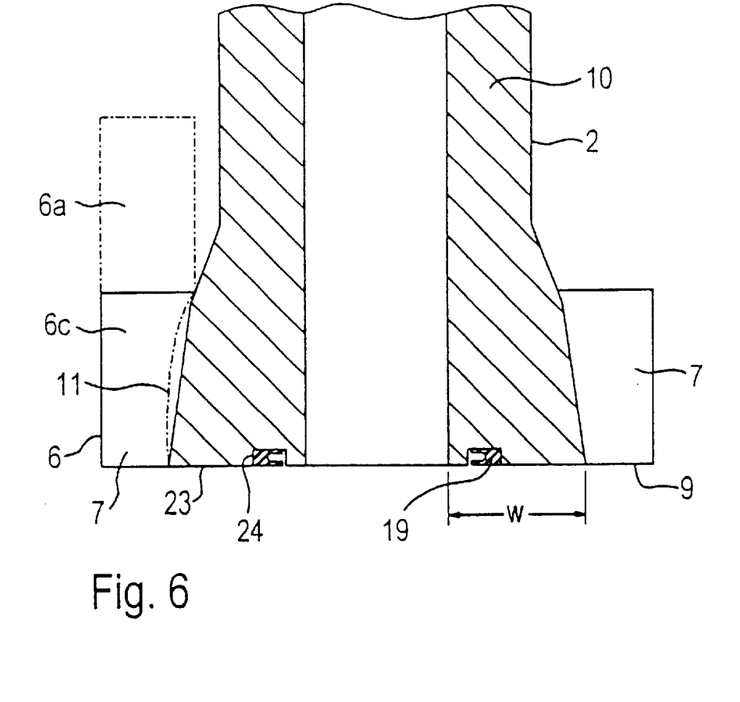
FIG. 6 is a longitudinal sectional view of a pipe end having shaped elements according to FIG. 4 and a modified configuration of the tension element.

A spring-back seal 19 can compensate for any possible deformations of the connecting partners, i.e. of the pipe ends 2, 3 and the tension elements 6. FIG. 6 shows an example of configuration of the spring-back seal 19. During assembly, a top and a bottom clamping ring 20 and 21, respectively, are placed around the connection 1, i.e. around the configuration of the tension elements 6, so that the latter are fixed at least during assembly (FIG. 1).

The tension elements 6 may also be cooled. Due to the fact that heat conduction from the hot steam D to the tension elements 6 is only indirect, the tension elements 6 can be cooled in a simple manner, for example by cooling ribs or by axial cooling bores. On account of the heat-transmission resistance between the medium D carried in the pipeline 4, 5 and the tension elements 6, only a comparatively small quantity of heat is to be dissipated, so that only a correspondingly slight reduction in the temperature of the medium D in the pipeline 4, 5 is effected. For the cooling, the tension elements 6 may be configured with a defined radial gap 22 (FIG. 1) relative to the pipeline 4, 5 in order to additionally reduce the heat conduction.

The rounding-off of the surface edges 13 to 15 of the tension element 6 and of the surface corners 13' to 15', corresponding with the latter, on the pipe outer surface 10 is of considerable importance with regard to a favorable configuration of the connecting partners 6 and 7, 8 from the notching point of view, in particular in the case of low residual material characteristics. The prestressing can be set in operation when required by specific heat control, e.g. by a permanent temperature difference between the tension elements 6 and the pipe ends 2, 3. Any differences in the thermal expansion when using different materials for the tension elements 6 on the one hand and the pipe ends 2, 3 on the other hand can be at least partly compensated for by temperature control, i.e. by specific cooling or heating, or also by shims 16 having high coefficients of expansion.

FIG. 6 shows a variant of the pipe connection 1 according to FIG. 1, having an undisturbed pipe wall thickness w increasing toward the parting seam 9 and thus toward a contact surface 23 of the respective pipe end 2, 3. This permits an especially favorable transmission of the load directed into the shaped elements 7, 8. An annular groove 24 for accommodating the spring-back seal 19 is formed in the contact surface 23.

The tension shank 6c of the tension element 6—as shown by a dash-lined contour in the left-hand half of FIG. 6—is channeled on its side facing the pipe ends 7, 8 and therefore has a concave bearing surface 11 in this region. The tension element 6 therefore has a notch-free region at the level of the contact surface 23 of the pipe end 7, 8, adjoining which notch-free region, in the direction of the respective shaped part 6a or 6b, is a region of enlarged cross section for reducing the notch stress.

This embodiment has the advantage that large cross sections are provided in the region of the force deflection, namely in the region between the shaped parts 6a, 6b and the tension shank 6c between the shaped elements 7, 8 and the pipe ends 2 and 3, respectively, these cross sections producing an especially low stress concentration at these locations. This therefore provides for an especially favorable configuration with regard to notch effects.

Figure 7:
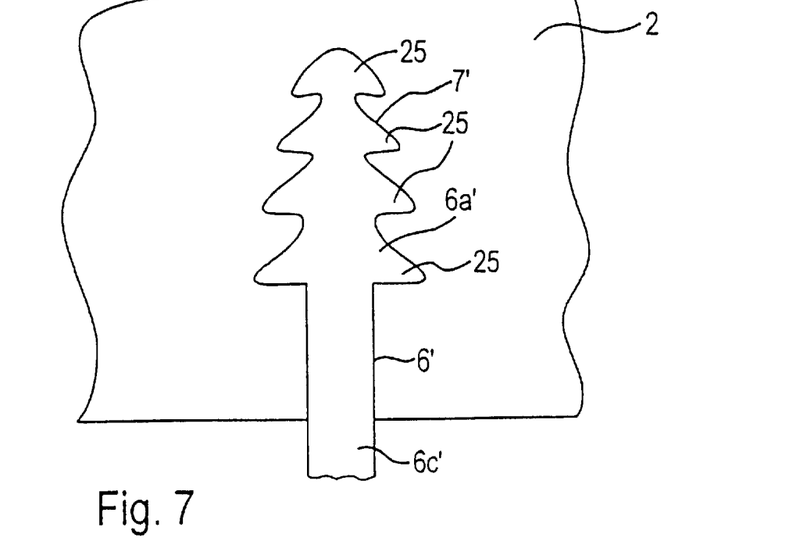
FIG. 7 is an illustration of an alternative embodiment of the pipe connection having a recess at the pipe end and having the tension element with a fir-tree-like shaped part.

FIG. 7 shows an alternative embodiment of the pipe connection 1 with reference to a detail of one of the pipe ends 2, 3. In this case, the shaped elements are formed by radial recesses 7', 8' on the respective pipe end 2, 3, only the shaped part 6a', for example, which rests in the recess 7' of the pipe end 2, of the tension element 6' being shown here. The tension element 6' is also of a symmetrical configuration in this embodiment. The shaped parts 6a', 6b' of the respective tension element 6' have a number of partial branches lying one behind the other in the longitudinal direction L of the pipe and being in engagement in the recess 7', 8' in a parallel configuration. In the exemplary embodiment, the shaped parts 6a', 6b' are shaped like a fir-tree root, as often used in blade roots of turbine blades (fir-tree-root connection). Other shapes are also conceivable, the outer contour of the respective shaped part 6a', 6b' being adapted in each case to the inner contour of the recess 7' and 8', respectively.

We claim:

1. In combination with a pipeline having connecting pipes with pipe ends and contact surfaces, a device for connecting the pipes through which a medium flows, the device comprising:

shaped elements disposed at the pipe ends of the pipes; and a number of tension elements distributed over a circumference of the pipe ends of the pipes, each of said tension elements having a tension shank with ends and extends in a longitudinal direction of the pipes between said shaped elements and said tension elements disposed adjacent to each other in a circumferential direction of the pipes, each of said tension elements having shaped parts with one of said shaped parts disposed at each of said ends of said tension shank and said shaped parts extend in a transverse direction of said tension elements, said shaped parts engage behind said shaped elements at an end remote from the contact surfaces of the pipe ends.

2. The device according to claim 1, wherein said shaped elements are radial projections extending out from the pipe ends.

3. The device according to claim 1, wherein the pipe ends have radial recesses formed therein for receiving said tension elements and said radial recesses are said shaped elements.

4. The device according to claim 3, wherein said shaped parts have a number of partial branches lying one behind another in the longitudinal direction of the pipes and are engaged by said radial recesses in a parallel configuration.

5. The device according to claim 1, wherein said tension elements are prestressed.

6. The device according to claim 1, including a shim disposed between one of said shaped elements and one of said shaped parts of said tension elements.

7. The device according to claim 1, including a spring-back seal disposed between the pipe ends.

8. The device according to claim 1, wherein said tension shank has a cross-sectional area shaped like a segment of a circle.

9. The device according to claim 1, wherein each of the pipe ends has a contact surface and a pipe wall thickness increasing toward the contact surface, and said tension shank is channeled on a side facing the pipe ends.

10. The device according to claim 1, wherein each of said tension elements has a bearing surface facing the pipe ends, said bearing surface has rounded-off surface edges in a region between said shaped parts, and said shaped elements in the region have surface corners corresponding with said rounded-off surface edges.

11. The device according to claim 1, wherein each of said tension elements is disposed so as to form a gap relative to the pipeline.

12. The device according to claim 1, wherein each of said tension elements has a heating bore formed therein.

13. The device according to claim 1, wherein each of said tension elements has a symmetrical configuration in both a longitudinal direction and a transverse direction.

14. The device according to claim 1, including at least one clamping ring surrounding said tension elements and disposed so as to be distributed over a circumference of said tension elements.

* * * * *